US011847468B2

(12) United States Patent
Basso et al.

(10) Patent No.: US 11,847,468 B2
(45) Date of Patent: Dec. 19, 2023

(54) DATA DEFRAGMENTATION FOR A SYSTEM BOOT PROCEDURE HAVING RANDOM INDEXES INDICATING A RELATIONSHIP BETWEEN SEQUENTIAL LOGICAL ADDRESSES AND RANDOM LOGICAL ADDRESSES

(71) Applicant: Micron Technology, Inc., Boise, ID (US)

(72) Inventors: Francesco Basso, Portici (IT); Luca Porzio, Casalnuovo (IT); Roberto Izzi, Caserta (IT); Francesco Falanga, Quarto (IT); Nadav Grosz, Broomfield, CO (US); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 136 days.

(21) Appl. No.: 17/645,687

(22) Filed: Dec. 22, 2021

(65) Prior Publication Data

US 2023/0195475 A1 Jun. 22, 2023

(51) Int. Cl.
*G06F 9/4401* (2018.01)
*G06F 3/06* (2006.01)

(52) U.S. Cl.
CPC ............ *G06F 9/4406* (2013.01); *G06F 3/061* (2013.01); *G06F 3/0644* (2013.01); *G06F 3/0683* (2013.01)

(58) Field of Classification Search
CPC ...... G06F 9/4406; G06F 3/061; G06F 3/0644; G06F 3/0683
See application file for complete search history.

(56) References Cited

U.S. PATENT DOCUMENTS

2021/0182075 A1* 6/2021 Jain .................. G06N 20/00
2021/0373907 A1* 12/2021 Liang ................ G06F 9/4408

* cited by examiner

*Primary Examiner* — Tammara R Peyton
(74) *Attorney, Agent, or Firm* — Holland & Hart LLP

(57) ABSTRACT

Methods, systems, and devices for data defragmentation for a system boot procedure are described. The memory system may determine a write random index associated with a boot procedure. The write random index may indicate a relationship between a first quantity of sequential logical addresses accessed as part of the boot procedure and a second quantity of random logical addresses accessed as part of the boot procedure. The memory system may determine whether the write random index satisfies a threshold based on determining the write random index. In some cases, the memory system may transfer, to a second portion of the memory system, data stored in a first portion of the memory system based on determining that the write random index satisfies the threshold. The memory system may receive a request to perform the boot procedure after transferring the data and output, to the host system, the data transferred.

25 Claims, 5 Drawing Sheets

DATA DEFRAGMENTATION FOR A SYSTEM BOOT PROCEDURE HAVING RANDOM INDEXES INDICATING A RELATIONSHIP BETWEEN SEQUENTIAL LOGICAL ADDRESSES AND RANDOM LOGICAL ADDRESSES

FIELD OF TECHNOLOGY

The following relates generally to one or more systems for memory and more specifically to data defragmentation for a system boot procedure.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
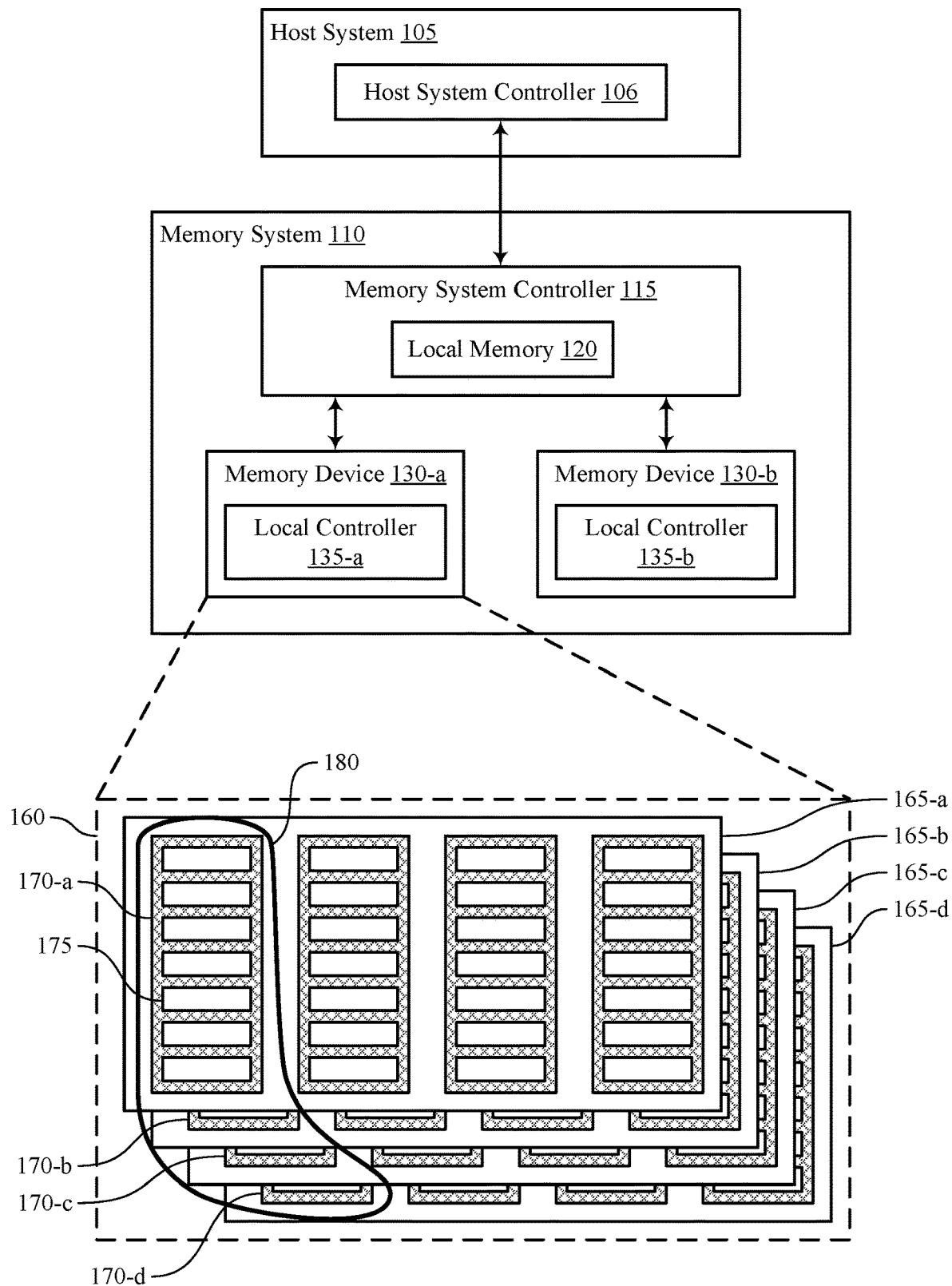
FIG. 1 illustrates an example of a system that supports data defragmentation for a system boot procedure in accordance with examples as disclosed herein.

Some systems (e.g., electronic devices, smart phones, automotive devices, etc.) may take a particular amount of time to boot-up. For example, the host system may request data from a memory device of the system during a boot procedure. In some cases, boot procedures may be expanding such that the host system requests increased amounts of data during a boot procedure, which may use a particular amount of time to read the data. It may be desirable to improve a user's experience by reducing the boot-up time of the overall system and increase efficiency of the memory system. The amount of time to boot-up may result in the memory system experiencing a performance loss, increased signaling overhead, and increased processing overhead for performing operations. In such cases, underutilizing the time during boot-up may decrease performance of the memory system, increase power consumption, or the like.

Systems, devices, and techniques are described for a memory system to defragment the data for the boot procedure. The memory system may record the logical addresses accessed during the boot procedure and defragment the data associated with the logical addresses accessed to optimize the overall duration of the boot procedure. In such cases, the memory system may determine a write random index associated with the boot procedure for the memory system. The write random index may indicate a relationship between a first quantity of sequential logical addresses accessed as part of the boot procedure and a second quantity of random logical addresses accessed as part of the boot procedure. In some cases, the memory system may determine whether the write random index satisfies a threshold. For example, the memory system may transfer data stored in a first portion of the memory system to a second portion of the memory system in response to determining that the write random index associated with the data satisfies the threshold. Transferring the data may be an example of the memory system defragmenting the data such that a portion of the data may be transferred to the second portion while another portion of data may remain in the first portion. The memory system may receive a request to perform the boot procedure after transferring the data and output the data transferred to the second portion to the host system.

In such cases, the defragmenting the data may reduce the time used to implement the boot procedure by decreasing a quantity of time to perform read operations and optimizing the contents (e.g., logical addresses) accessed during the read operation. For example, the data may be reorganized to improve the quantity of data retrieved as part of a multi-plane read operation. Relocating the data to ensure that the system boot data may be moved from a first physical location to a same physical block of the memory system may reduce the quantity of different read accesses the memory system performs to retrieve the data, thereby reducing command latency and allowing for fast and efficient boot procedures. Because data is defragmented and rearranged into a sequential pattern, the host system may access the data more quickly than the backend procedures used for reading data from NAND each time a command is issued. Such techniques may increase the performance of the memory system experiencing improved read speeds, reduced power consumption, decreased processing complexity, and improved processing times.

Features of the disclosure are initially described in the context of a system with reference to FIG. 1. Features of the disclosure are described in the context of a block diagram and a flow diagram with reference to FIGS. 2-3. These and other features of the disclosure are further illustrated by and described in the context of an apparatus diagram and flowchart that relate to data defragmentation for a system boot procedure with reference to FIGS. 4-5.

FIG. 1 illustrates an example of a system 100 that supports data defragmentation for a system boot procedure in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

The system 100 may include any quantity of non-transitory computer readable media that support data defragmentation for a system boot procedure. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the system 100 may perform data defragmentation for a system boot procedure. The system 100 may determine the write random index. The write random index may indicate a random distribution level associated with the logical addresses, and based on the write random index, the system 100 may relocate the logical addresses. For example, the system 100 may determine whether the write random index satisfies a threshold. If the system 100 determines that the write random index satisfies the threshold, the system 100 may reorganize the data (e.g., logical addresses). For example, the system 100 may transfer, to a second portion of the memory system 110, data stored in a first portion of the memory system 110 based on determining that the write random index satisfies the threshold. The system 100 may receive a request to perform the boot procedure, perform the boot procedure, and output, to the host system 105, the reorganized data. In some cases, the system may determine that the write random index fails to satisfy the threshold, and the system 100 may refrain from reorganizing the data until the write random index satisfies the threshold.

In some cases, a location of information for the boot procedure may change an address of the LBAs and physical block addresses (e.g., PBAs). In such cases, the PBAs accessed as part of the boot procedure may be recorded. After the boot procedure, the memory system may reorganize the PBAs as part of background operations to reduce the quantity of accesses during the next boot procedure. In some cases, the memory system may reorganize the PBAs based on multi-plane aspects associated with a system block page data structure.

Some memory systems may use a different addressing scheme than an associated host system 105. For example, a host system 105 may identify data using logical addresses (e.g., LBAs, virtual addresses, system addresses, or other logical addresses) and the memory system 110 may store the data at physical addresses that are independent of the logical addresses used by the host system 105. A physical address may identify a physical location of a corresponding memory cell (e.g., or a page of memory cells) within a memory device 130. The physical location of data within the memory device 130 may change over time due to the memory device 130 accommodating the writing of additional data, maintenance operations performed by the memory device 130, or for other reasons. A host system 105 coupled with the memory system 110 may reference data (e.g., if issuing read, write, or other commands associated with the data) using the logical addresses, and the memory system 110 may generate and maintain a logical-to-physical (L2P) mapping between the logical addresses used in the communications with the host system 105 and the physical addresses of the memory cells at which the data is stored.

Figure 2:
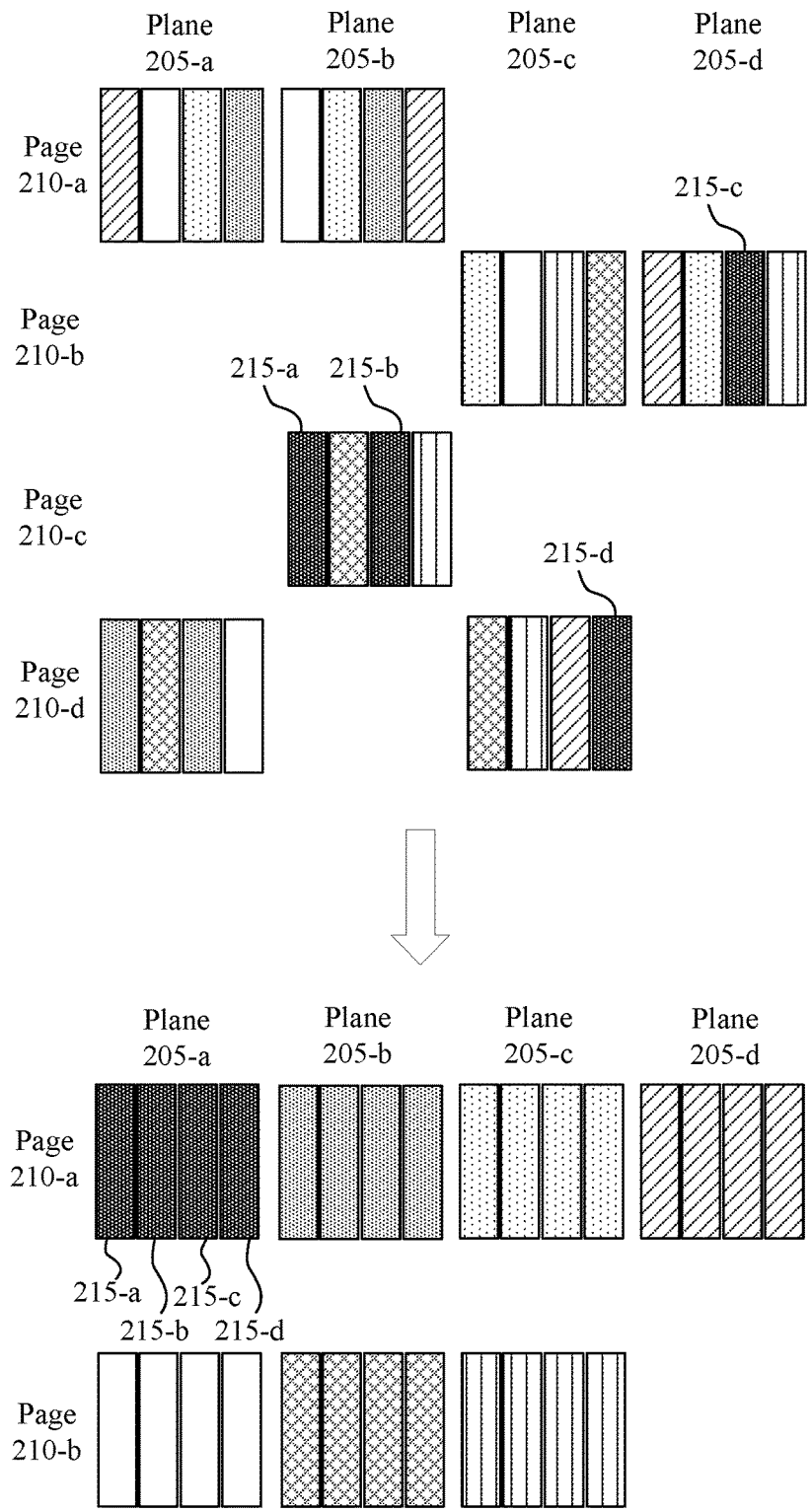
FIG. 2 illustrates an example of a block diagram that supports data defragmentation for a system boot procedure in accordance with examples as disclosed herein.

FIG. 2 illustrates an example of a block diagram 200 that supports data defragmentation for a system boot procedure in accordance with examples as disclosed herein. The block diagram 200 may be implanted in a memory system, which may be examples of the corresponding device described with respect to FIG. 1. The block diagram may include at least planes 205, pages 210, and data 215. Data 215 may include at least a first portion of data 215-a, a second portion of data 215-b, a third portion of data 215-c and a fourth portion of data 215-d. The data 215 may include at least LBAs or PBAs.

In some cases, the duration of the boot-up time during the boot procedure may impact the user experience for memory systems implemented in automotive or mobile device applications. During the boot procedure, memory system may load the boot code for the boot procedure by reading the data 215. In some memory systems, how the data 215 is stored (e.g., written) in the storage device may affect the read execution latencies. For example, if the memory system writes the data 215 in a random write pattern (e.g., scattered throughout the memory system), the memory system may perform multiple read operations to retrieve the data 215, thereby increasing the latency experienced by the memory system to access the data 215. For example, the memory system may store the data 215 in multiple planes 205 and pages 210. If the memory system writes the data 215 in a sequential write pattern, the memory system may perform fewer read operations to retrieve the data 215, thereby optimizing the read command and reducing the overall read latency. In such cases, the memory system may store the data 215 in a single plane 205 and page 210. In some cases, the boot code may be updated or modified such that the memory system may be unable to predict whether the write pattern may be random or sequential. In such cases, the memory system may be unable to guarantee a full sequential write pattern for each access operation.

To address these and other deficiencies, the memory system may relocate boot data in the NAND based on a learned host LBA sequence at system power-on. For example, the memory system may relocate data 215 such that the system boot data may be moved from different physical locations (e.g., in different NAND physical blocks) to a same NAND physical block, thereby reducing a quantity of different read operations to access the data 215. The memory system may defragment the data 215 to ensure that both LBAs and PBAs may be optimized to achieve faster performance during boot time. For example, the memory system may organize the data 215 such that each address is sequential to the subsequent address, thereby increasing a quantity of sequential reads. Storing the data 215 for the boot procedure in a same location in the memory system may enable the memory system to perform fewer access operations to access the data 215 as compared to if the data 215 is scattered throughout the memory system (e.g., stored in different locations of the memory system). In such case, reorganizing the data to be sequential may reduce a quantity of accesses preformed to access the content.

The block diagram 200 may include a first plane 205-a, a second plane 205-b, a third plane 205-c, and a fourth plane 205-d. In some cases, each plane 205 may include at least a first page 210-*a*, a second page 210-*b*, a third page 210-*c*, and a fourth page 210-*d*. Each plane 205 and page 210 may store at least four portions of data 215. The memory system may request to access the data 215 of the boot procedure. However, the data 215 may be scattered across multiple planes 205 and pages 210. For example, a first portion of data 215-*a* and a second portion of data 215-*b* may be located in the second plane 205-*b* and the third page 210-*c*. A third portion of data 215-*c* may be located in the fourth plane 205-*d* and the second page 210-*b*, and a fourth portion of data 215-*d* may be located in the third plane 205-*c* and the fourth page 210-*d*.

The memory system may determine that the data 215 is non-sequential data. For example, the portions of data 215 may be non-sequentially indexed. In such cases, the data 215 may be stored in different planes 205 and/or pages 210 across the memory system. In some examples, the memory system may determine that the data 215 stored in the first portion of the memory system is non-sequential data. The first portion of the memory system may be an example of any one of the second plane 205-*b*, the third plane 205-*c*, or the fourth plane 205-*d* and any one of the second page 210-*b*, the third page 210-*c*, and the fourth page 210-*d*.

The memory system may perform at least three access operations to access the first portion of data 215-*a*, the second portion of data 215-*b*, the third portion of data 215-*c*, and the fourth portion of data 215-*d*. For example, the memory system may access the second plane 205-*b* and the third page 210-*c* to access the first portion of data 215-*a* and the second portion of data 215-*b* in a first access operation. The memory system may access the fourth plane 205-*d* and the second page 210-*b* to access the third portion of data 215-*c* in a third access operation. The memory system may access the third plane 205-*c* and the fourth page 210-*d* to access the fourth portion of data 215-*d* in a fourth access operation. In such cases, the data 215 may be scattered such that the data 215 may be written in a random write pattern.

In some examples, the memory system may determine a relationship between a quantity of access operations as part of the boot procedure and a quantity of planes 205 to be accessed as part of the access operations for data 215. For example, the memory system may determine a relationship between the three access operations to access data 215 and the three planes 205 (e.g., plane 205-*b*, 205-*c*, and 205-*d*) to be accessed as part of the access operations for the data 215. In such cases, the memory system may determine a sequential layout to store data 215 based on determining the relationship. The data 215 may be rewritten sequentially based on the plane relationship within the memory system. The plane relationship may be an example of a read quad plane or a cache read multiplane. In some cases, the plane relationship may determine the write random index.

For example, the memory system may determine the write random index. The write random index may indicate a quantity of access operations performed to retrieve the data 215. In some cases, the write random index may indicate a quantitative measurement of the randomness of addresses accessed. For example, the write random index may indicate a quantity (e.g., value, percentage, etc.) of the data 215 that is scattered across more the memory system (e.g., than one plane 205). In such cases, the memory system may determine that the data 215 is non-sequential in direct response to determining the write random index.

In some cases, the write random index may indicate the quantity of read operations performed to read an amount of data. If the memory system performs multiple read operations to read a same amount of data, the memory system may determine that the data 215 is non-sequential and that the write random index satisfies the threshold. If the memory system performs a single read operation to read the same amount of data, the memory system may determine that the data 215 is sequential and that the write random index fails to satisfy the threshold. In some cases, the memory system may determine a sequential layout to store data 215 based on determining a write random index. For example, the memory system may determine a sequential layout in response to determining that the write random index satisfies the threshold.

In some examples, the memory system may determine that a quantity of access operations satisfies (e.g., exceeds) the threshold. In such cases, the memory system may defragment the data 215 in direct response to determining that the quantity of access operations satisfies the threshold. The memory system may defragment the data 215 each time the write random index satisfies the threshold. In some cases, the data 215 may be updated during the boot procedure. In such cases, the memory system may determine that the write random index increases as the data 215 is updated during the boot procedure. In some cases, the memory system may determine that the quantity of access operations fails to satisfy (e.g., is below) the threshold. In such cases, the memory system may refrain from defragmenting the data 215.

The write random index may indicate a relationship between a first quantity of sequential logical addresses accessed as part of the boot procedure and a second quantity of random logical addresses accessed as part of the boot procedure. In some examples, the memory system may determine a relationship between a first quantity of data (e.g., first portion of data 215-*a* and second portion of data 215-*b*) from at least a first plane (e.g., plane 205-*b*) of the memory system and a second quantity of data (e.g., third portion of data 215-*c* and/or fourth portion of data 215-*d*) from a second plane (e.g., plane 205-*d*) of the memory system. The determined relationship may determine the write random index.

The memory system may compare a quantity of access operations for one or more planes 205 to be accessed as part of the boot procedure to the threshold in response to determining the write random index. For example, the memory system may compare the three access operations to access the data 215 located in planes 205-*b*, 205-*c*, and 205-*d* to the threshold. The memory system may compare a quantity of NAND accesses to the threshold for a portion of data, a portion of time during the boot procedure, or both. In some cases, comparing the quantity of access operations to the threshold may be based on a granularity of the measurement. For example, the block diagram 200 may include seven different sets of data (e.g., each including four portions of data). The granularity of the measurement may be based on a quantity of different sets of data, a quantity of planes 205, a quantity of pages 210, or a combination thereof.

The memory system may determine that the write random index satisfies the threshold. In such cases, the memory system may perform a data defragmentation operation to reorganize the data (e.g., addresses) and move the first portion of data 215 to a same page and a same plane (e.g., first plane 205-*a* and first page 210-*a*) such that the first portion of data 215 may be accessed in a single access operation. For example, the memory system may transfer the first portion of data 215-*a* and the second portion of data 215-*b* stored in the second plane 205-*b* and the third page 210-*c* (e.g., a first portion of the memory system) to the first plane 205-*a* and the first page 210-*a* (e.g., a second portion of the memory system) based on determining that the write random index satisfies the threshold.

In such case, the memory system may move a first portion of data 215-a from a first page 210-c of a first plane 205-b to a second page 210-a of a second plane 205-a. The memory system may move a second portion of data 215-b from the first page 210-c of the first plane 205-b to the second page 210-a of the second plane 205-a. The memory system may move a third portion of data 215-c from a second page 210-b of a fourth plane 205-d to the second page 210-a of the second plane 205-a. The memory system may move a fourth portion of data 215-d from a fourth page 210-d of a third plane 205-c to the second page 210-a of the second plane 205-a.

The memory system may store the data 215 in the second portion (e.g., plane 205-a and page 210-a) of the memory system and determine that the data 215 stored in the plane 205-a and page 210-a is sequential data. In such cases, the fourth portion of data 215-d may be sequentially indexed after the third portion of data 215-c. The third portion of data 215-c may be sequentially indexed after the second portion of data 215-b, and the second portion of data 215-b may be sequentially indexed after the first portion of data 215-a. Moving the data 215 to be sequential may be referred to as data defragmentation. The memory system may output data 215 to the host system via a single access operation. For example, the memory system may access the first plane 205-a and the first page 210-a to output the data 215.

In such cases, the following boot procedure may experience improved read speeds and decreased processing times by reducing a quantity access operations due to increased data read per read operation. Moving the data into a same plane and a same page may decrease the duration of the boot-up time during the boot procedure, thereby decreasing the latency of each command and improving the boot-up processing time by defragmenting the LBAs. In such cases, the memory system may perform an increased quantity of read operations over a shorter duration of time because contents may be optimized for read access and readahead techniques may be implemented, thereby reducing the overall storage access time.

Figure 3:
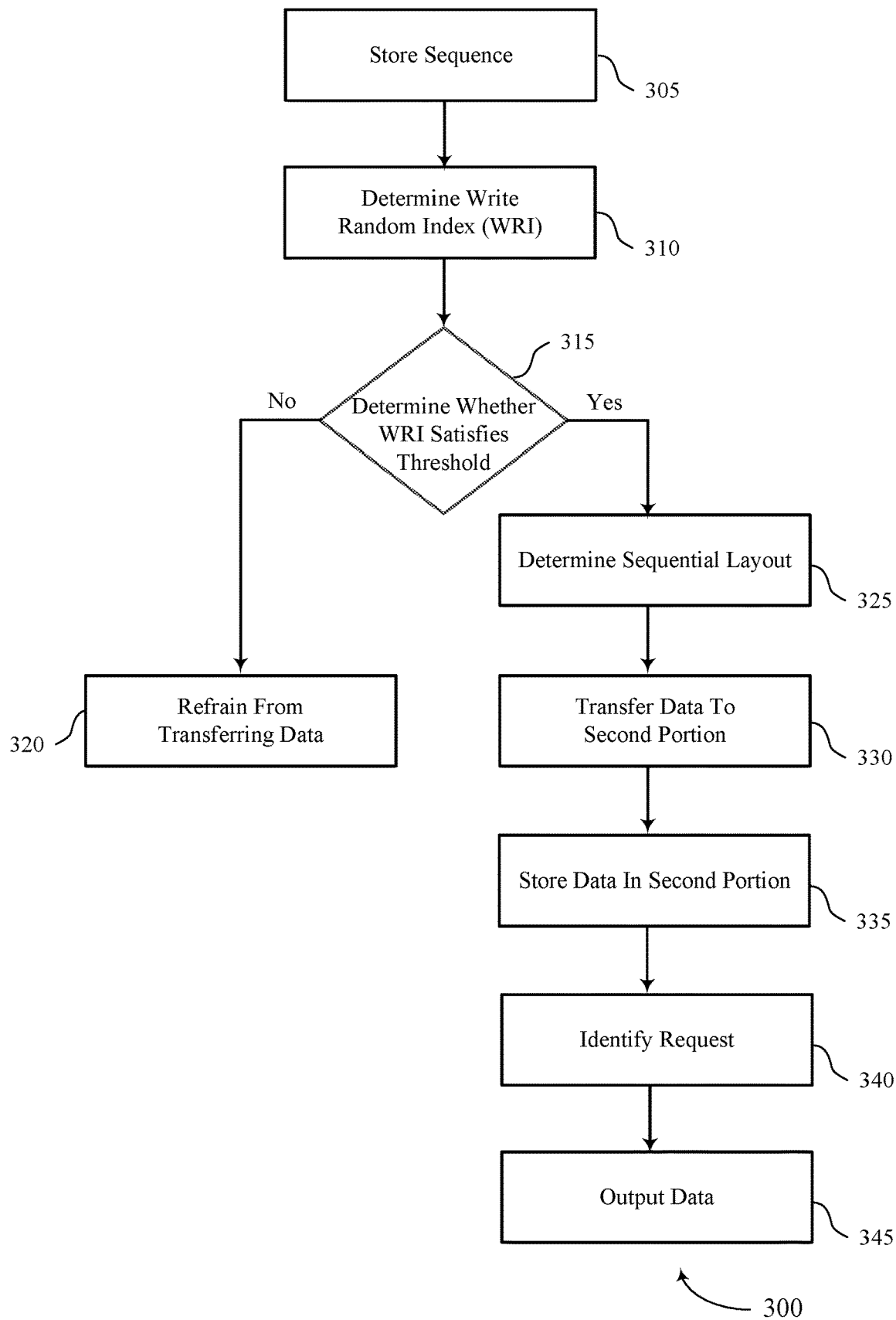
FIG. 3 illustrates an example of a flow diagram that supports data defragmentation for a system boot procedure in accordance with examples as disclosed herein.

FIG. 3 illustrates an example of a flow diagram 300 that supports data defragmentation for a system boot procedure in accordance with examples as disclosed herein. The flow diagram 300 may include a host system and a memory system. The host system and the memory system may be examples of the corresponding devices described with respect to FIGS. 1 and 2. Alternative examples of the following may be implemented, where some steps are performed in a different order than described or not performed at all. In some cases, steps may include additional features not mentioned below, or further steps may be added.

Aspects of the flow diagram 300 may be implemented by a controller, among other components. Additionally or alternatively, aspects of the flow diagram 300 may be implemented as instructions stored in memory (e.g., firmware stored in a memory coupled with controller). For example, the instructions, when executed by a controller, may cause the controller to perform the operations of the flow diagram 300.

At 305, a sequence may be stored. For example, the memory system may store a sequence of addresses accessed as part of the boot procedure. In such cases, the memory system may record the data accessed (e.g., sequence of addresses accessed) as part of the boot procedure. In some cases, the sequence may be stored in the memory system. The boot procedure may include a set of addresses accessed during the boot procedure. For example, the memory system may store the boot procedure.

The memory system may detect the boot procedure and determine the boot-up sequence. The boot-up sequence (e.g., LBA sequence) may be recorded during the boot procedure. For example, the memory system may record information associated with which data is updated, an age of the data (e.g., duration of time between receiving the data and outputting the data), a duration of time since the date was updated, or a combination thereof. If the data was updated recently, the memory system may refrain from reorganizing the contents.

At 310, a write random index may be determined. For example, the memory system may determine a write random index associated with a boot procedure for the memory system. The write random index may indicate a relationship between a first quantity of sequential logical addresses accessed as part of the boot procedure and a second quantity of random logical addresses accessed as part of the boot procedure. In some cases, the memory system may determine the write random index based on storing the boot procedure. The write random index may indicate whether the data was written based on a random write pattern or a sequential write pattern.

In some cases, the memory system may determine a relationship between a first quantity of data from at least a first plane of the memory system and a second quantity of data from a second plane of the memory system. The memory system may determine the write random index e based on determining the relationship. In such cases, the memory system may rewrite data associated with the boot procedure based on determining that the data was written in a random write pattern.

At 315, a determination may be made whether the write random index satisfies a threshold. For example, the memory system may determine whether the write random index satisfies a threshold in response to determining the write random index. In some cases, the memory system may compare a quantity of access operations for one or more planes to be accessed as part of the boot procedure to the threshold in direct response to determining the write random index. For example, the memory system may compare the quantity of NAND accesses to the threshold. In such cases, determining whether the write random index satisfies the threshold wherein may be based on the comparing.

The memory system may determine that the write random index satisfies the threshold. In such cases, the memory system may determine that the data stored in the first portion is non-sequential data in direct response to determining that the write random index satisfies the threshold. For example, the memory system may determine the write random index based on a random distribution level of the data.

In some examples, the memory system may determine that the write random index fails to satisfy the threshold. For example, the memory system may determine that the write random index fails to satisfy the threshold in response to determining the write random index. In some cases, the memory system may determine that the data stored in the first portion is sequential data in direct response to determining that the write random index fails to satisfy the threshold. For example, the memory system may determine the write random index based on a sequential distribution level of the data.

At 320, transferring data may be refrained. For example, the memory system may refrain from transferring, to the second portion of the memory system, the data stored in the first portion of the memory system in response to determining that the write random index fails to satisfy the threshold. In such cases, the memory system may determine that the write random index is below the threshold and refrain from reorganizing the data.

At 325, a sequential layout may be determined. For example, the memory system may determine a sequential layout to store the data in the memory system in response to determining that the write random index satisfies the threshold. In such cases, the memory system may determine the sequential order to store the data based on the write random index.

In some cases, the memory system may determine a relationship between a quantity of access operations as part of the boot procedure and a quantity of planes to be accessed as part of the access operations. The memory system may determine the sequential layout based on determining the relationship. For example, the memory system may rewrite data related to the boot procedure in an organized (e.g., sequential) manner based on the features of the planes. In some cases, the sequential layout may be based on a read quad plane, a cache read multiplane, or both. For example, the memory system may rewrite data based on read quad plane or cache read multiplane.

At 330, data may be transferred to a second portion. For example, the memory system may transfer, to a second portion of the memory system, data stored in a first portion of the memory system based on determining that the write random index satisfies the threshold. The memory system may transfer data stored in the first portion to the second portion in response to determining that the data stored in the first portion in non-sequential data. In some cases, the memory system may transfer data stored in the first portion to the second portion in direct response to determining the sequential layout. In some cases, transferring data stored in the first portion to the second portion occurs as a background operation after the boot procedure is complete. The memory system may reorganize the data as part of background operations to reduce the quantity of accesses during the next boot procedure.

In some examples, the memory system may move a first portion of data from a first page of a first plane to a second page of a second plane and move a second portion of data from a third page of a third plane to the second page of the second plane. In such cases, an address of the first page that stores the second portion of data may be sequentially indexed with a second address of the second page that stores the first portion of data. The memory system may reorganize the data from a random write pattern to a sequential write pattern after the defragmentation optimization. In such cases, the memory system may move data to a same page on a same plane At 335, data may be stored in the second portion. For example, the memory system may store the data in the second portion of the memory system in response to transferring data stored in the first portion to the second portion and/or determining that the data stored in the second portion is sequential data. In such cases, the memory system may reorganize the data in a sequential write pattern.

At 340, a request may be identified. For example the memory system may receive a request for the memory system to perform the boot procedure after transferring the data. In such cases, the memory system may receive a request for an access operation. The memory system may identify a request for the memory system to perform an access operation based on transferring data stored in the first portion to the second portion and/or receiving the request.

At 345, data may be outputted. For example, the memory system may output, to a host system, the data transferred to the second portion of the memory device. In some cases, the memory system may output the data based on determining the that the data is sequential data. In some examples, the memory system may output the data transferred to the second portion of the memory system in response to identifying the request.

Figure 4:
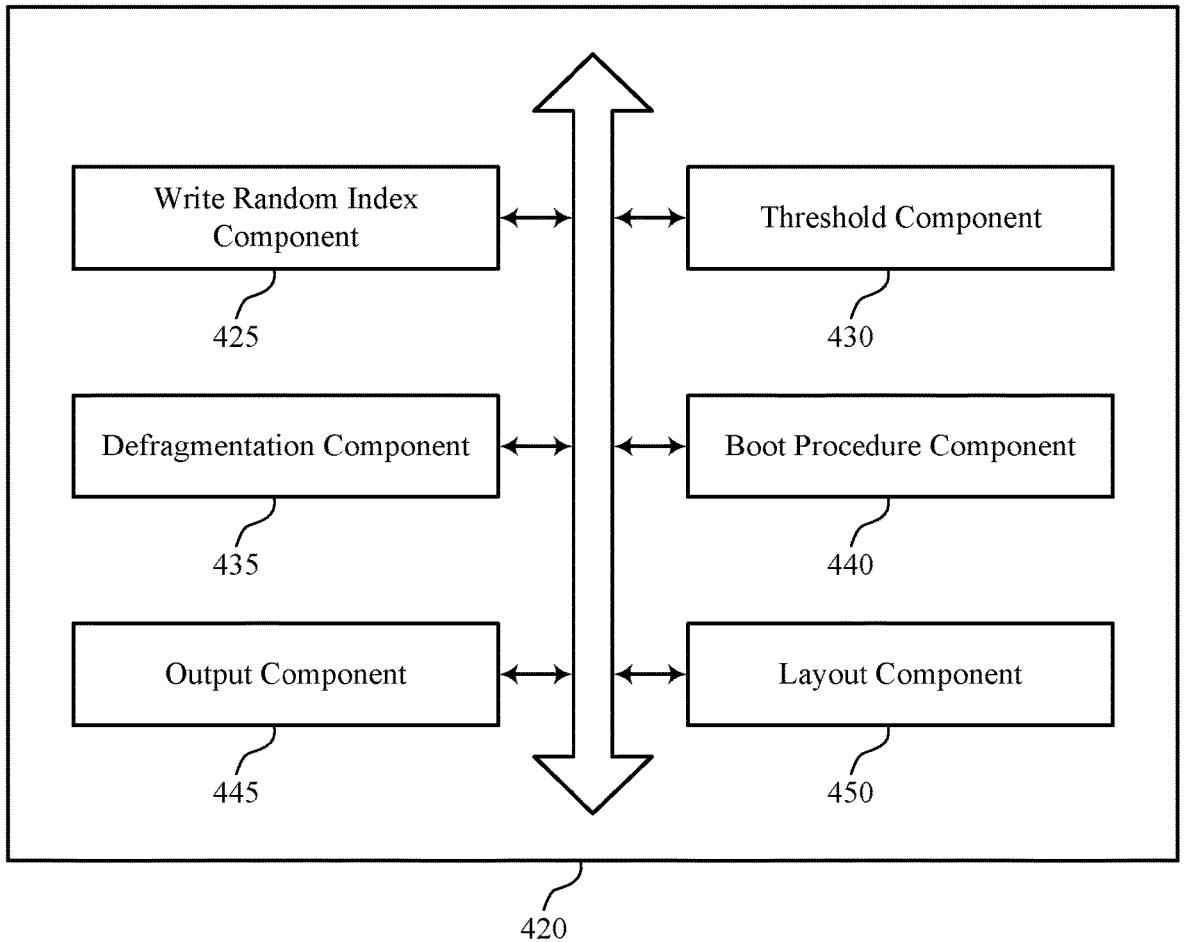
FIG. 4 shows a block diagram of a memory system that supports data defragmentation for a system boot procedure in accordance with examples as disclosed herein.

FIG. 4 shows a block diagram 400 of a memory system 420 that supports data defragmentation for a system boot procedure in accordance with examples as disclosed herein. The memory system 420 may be an example of aspects of a memory system as described with reference to FIGS. 1 through 3. The memory system 420, or various components thereof, may be an example of means for performing various aspects of data defragmentation for a system boot procedure as described herein. For example, the memory system 420 may include a write random index component 425, a threshold component 430, a defragmentation component 435, a boot procedure component 440, an output component 445, a layout component 450, or any combination thereof. Each of these components may communicate, directly or indirectly, with one another (e.g., via one or more buses).

The write random index component 425 may be configured as or otherwise support a means for determining a write random index associated with a boot procedure for a memory system, the write random index indicating a relationship between a first quantity of sequential logical addresses accessed as part of the boot procedure and a second quantity of random logical addresses accessed as part of the boot procedure. The threshold component 430 may be configured as or otherwise support a means for determining whether the write random index satisfies a threshold based at least in part on determining the write random index. The defragmentation component 435 may be configured as or otherwise support a means for transferring, to a second portion of the memory system, data stored in a first portion of the memory system based at least in part on determining that the write random index satisfies the threshold. The boot procedure component 440 may be configured as or otherwise support a means for receiving a request for the memory system to perform the boot procedure after transferring the data. The output component 445 may be configured as or otherwise support a means for outputting, to a host system, the data transferred to the second portion of the memory system.

In some examples, to support transferring data stored in the first portion to the second portion, the defragmentation component 435 may be configured as or otherwise support a means for moving a first portion of data from a first page of a first plane to a second page of a second plane. In some examples, to support transferring data stored in the first portion to the second portion, the defragmentation component 435 may be configured as or otherwise support a means for moving a second portion of data from a third page of a third plane to the second page of the second plane, where an address of the first page that stores the second portion of data is sequentially indexed with a second address of the second page that stores the first portion of data.

In some examples, the layout component 450 may be configured as or otherwise support a means for determining a sequential layout to store the data in the memory system based at least in part on determining that the write random index satisfies the threshold, where transferring data stored in the first portion to the second portion is based at least in part on determining the sequential layout.

In some examples, the layout component 450 may be configured as or otherwise support a means for determining a relationship between a quantity of access operations as part of the boot procedure and a quantity of planes to be accessed as part of the access operations, where determining the sequential layout is based at least in part on determining the relationship.

In some examples, the sequential layout is based at least in part on a read quad plane, a cache read multiplane, or both.

In some examples, the write random index component 425 may be configured as or otherwise support a means for determining a relationship between a first quantity of data from at least a first plane of the memory system and a second quantity of data from a second plane of the memory system, where determining the write random index is based at least in part on determining the relationship.

In some examples, the threshold component 430 may be configured as or otherwise support a means for comparing a quantity of access operations for one or more planes to be accessed as part of the boot procedure to the threshold based at least in part on determining the write random index, where determining whether the write random index satisfies the threshold where is based at least in part on the comparing.

In some examples, the boot procedure component 440 may be configured as or otherwise support a means for storing, in the memory system, a sequence of addresses accessed as part of the boot procedure, where determining the write random index is based at least in part on storing the boot procedure, and where the boot procedure includes a set of addresses accessed during the boot procedure.

In some examples, the defragmentation component 435 may be configured as or otherwise support a means for storing the data in the second portion of the memory system based at least in part on transferring data stored in the first portion to the second portion. In some examples, the defragmentation component 435 may be configured as or otherwise support a means for determining that the data stored in the second portion is sequential data, where outputting the data is based at least in part on determining the that the data is sequential data.

In some examples, the threshold component 430 may be configured as or otherwise support a means for determining that the data stored in the first portion is non-sequential data based at least in part on determining that the write random index satisfies the threshold, where transferring data stored in the first portion to the second portion is based at least in part on determining that the data stored in the first portion in non-sequential data.

In some examples, the boot procedure component 440 may be configured as or otherwise support a means for identifying a request for the memory system to perform an access operation based at least in part on transferring data stored in the first portion to the second portion, where outputting the data transferred to the second portion of the memory system is based at least in part on identifying the request.

In some examples, the threshold component 430 may be configured as or otherwise support a means for determining that the write random index fails to satisfy the threshold based at least in part on determining the write random index. In some examples, the defragmentation component 435 may be configured as or otherwise support a means for refraining from transferring, to the second portion of the memory system, the data stored in the first portion of the memory system.

In some examples, transferring data stored in the first portion to the second portion occurs as a background operation after the boot procedure is complete.

Figure 5:
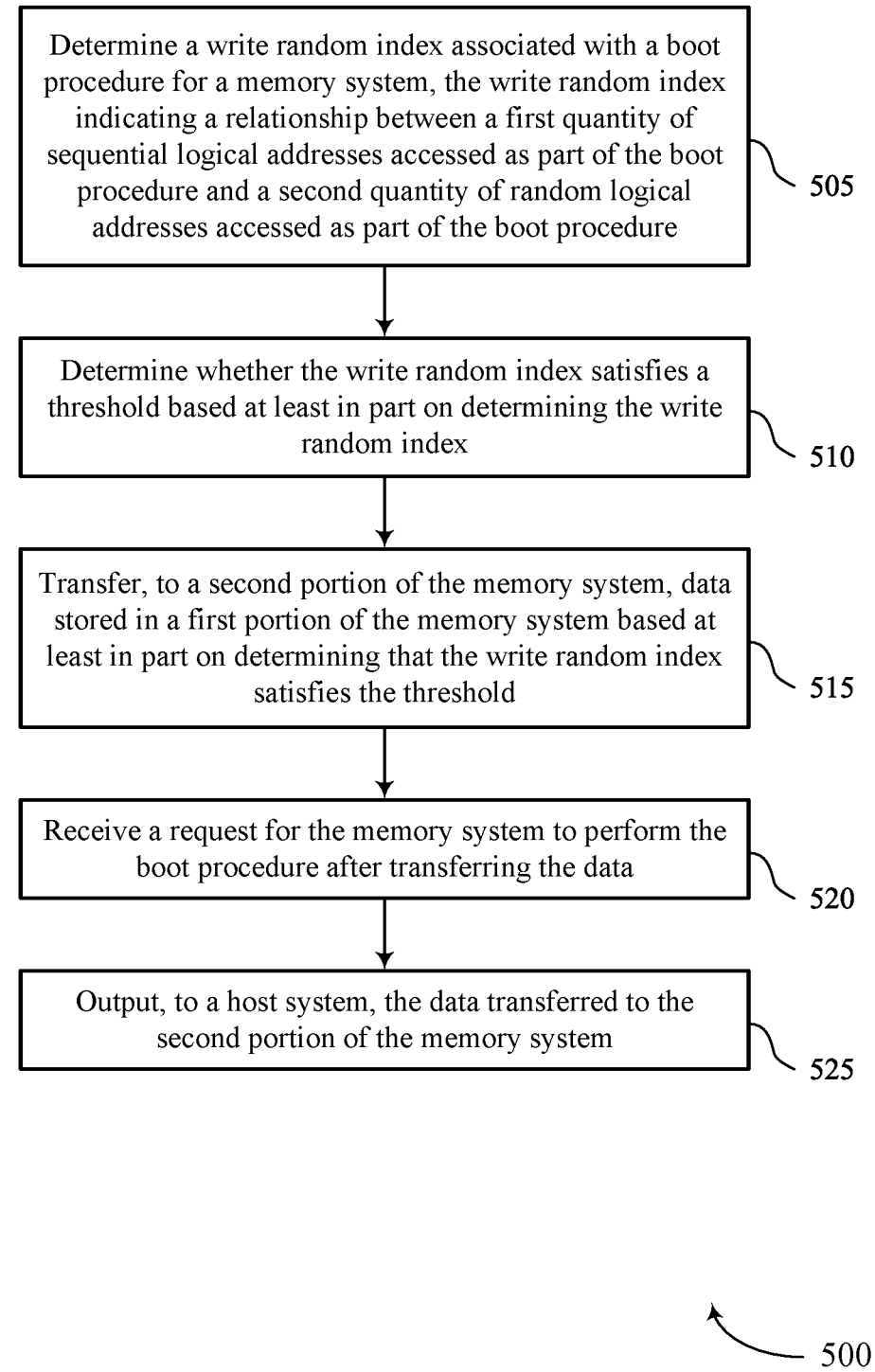
FIG. 5 shows a flowchart illustrating a method or methods that support data defragmentation for a system boot procedure in accordance with examples as disclosed herein.

FIG. 5 shows a flowchart illustrating a method 500 that supports data defragmentation for a system boot procedure in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, a write random index may be determined. The method may include determining a write random index associated with a boot procedure for a memory system, the write random index indicating a relationship between a first quantity of sequential logical addresses accessed as part of the boot procedure and a second quantity of random logical addresses accessed as part of the boot procedure. The operations of 505 may be performed in accordance with examples as disclosed herein. In some examples, aspects of the operations of 505 may be performed by a write random index component 425 as described with reference to FIG. 4.

At 510, whether the write random index satisfies a threshold may be determined. The method may include determining whether the write random index satisfies a threshold based at least in part on determining the write random index. The operations of 510 may be performed in accordance with examples as disclosed herein. In some examples, aspects of the operations of 510 may be performed by a threshold component 430 as described with reference to FIG. 4.

At 515, data may be transferred. The method may include transferring, to a second portion of the memory system, data stored in a first portion of the memory system based at least in part on determining that the write random index satisfies the threshold. The operations of 515 may be performed in accordance with examples as disclosed herein. In some examples, aspects of the operations of 515 may be performed by a defragmentation component 435 as described with reference to FIG. 4.

At 520, a request may be received. The method may include receiving a request for the memory system to perform the boot procedure after transferring the data. The operations of 520 may be performed in accordance with examples as disclosed herein. In some examples, aspects of the operations of 520 may be performed by a boot procedure component 440 as described with reference to FIG. 4.

At 525, data may be outputted. The method may include outputting, to a host system, the data transferred to the second portion of the memory system. The operations of 525 may be performed in accordance with examples as disclosed herein. In some examples, aspects of the operations of 525 may be performed by an output component 445 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for determining a write random index associated with a boot procedure for a memory system, the write random index indicating a relationship between a first quantity of sequential logical addresses accessed as part of the boot procedure and a second quantity of random logical addresses accessed as part of the boot procedure; determining whether the write random index satisfies a threshold based at least in part on determining the write random index; transferring, to a second portion of the memory system, data stored in a first portion of the memory system based at least in part on determining that the write random index satisfies the threshold; receiving a request for the memory system to perform the boot procedure after transferring the data; and outputting, to a host system, the data transferred to the second portion of the memory system.

Aspect 2: The apparatus of aspect 1 where transferring data stored in the first portion to the second portion, further includes operations, features, circuitry, logic, means, or instructions, or any combination thereof for moving a first portion of data from a first page of a first plane to a second page of a second plane and moving a second portion of data from a third page of a third plane to the second page of the second plane, where an address of the first page that stores the second portion of data is sequentially indexed with a second address of the second page that stores the first portion of data.

Aspect 3: The apparatus of any of aspects 1 through 2, further including operations, features, circuitry, logic, means, or instructions, or any combination thereof for determining a sequential layout to store the data in the memory system based at least in part on determining that the write random index satisfies the threshold, where transferring data stored in the first portion to the second portion is based at least in part on determining the sequential layout.

Aspect 4: The apparatus of aspect 3, further including operations, features, circuitry, logic, means, or instructions, or any combination thereof for determining a relationship between a quantity of access operations as part of the boot procedure and a quantity of planes to be accessed as part of the access operations, where determining the sequential layout is based at least in part on determining the relationship.

Aspect 5: The apparatus of any of aspects 3 through 4, further including operations, features, circuitry, logic, means, or instructions, or any combination thereof for the sequential layout is based at least in part on a read quad plane, a cache read multiplane, or both.

Aspect 6: The apparatus of any of aspects 1 through 5, further including operations, features, circuitry, logic, means, or instructions, or any combination thereof for determining a relationship between a first quantity of data from at least a first plane of the memory system and a second quantity of data from a second plane of the memory system, where determining the write random index is based at least in part on determining the relationship.

Aspect 7: The apparatus of any of aspects 1 through 6, further including operations, features, circuitry, logic, means, or instructions, or any combination thereof for comparing a quantity of access operations for one or more planes to be accessed as part of the boot procedure to the threshold based at least in part on determining the write random index, where determining whether the write random index satisfies the threshold where is based at least in part on the comparing.

Aspect 8: The apparatus of any of aspects 1 through 7, further including operations, features, circuitry, logic, means, or instructions, or any combination thereof for storing, in the memory system, a sequence of addresses accessed as part of the boot procedure, where determining the write random index is based at least in part on storing the boot procedure, and where the boot procedure includes a set of addresses accessed during the boot procedure.

Aspect 9: The apparatus of any of aspects 1 through 8, further including operations, features, circuitry, logic, means, or instructions, or any combination thereof for storing the data in the second portion of the memory system based at least in part on transferring data stored in the first portion to the second portion and determining that the data stored in the second portion is sequential data, where outputting the data is based at least in part on determining the that the data is sequential data.

Aspect 10: The apparatus of any of aspects 1 through 9, further including operations, features, circuitry, logic, means, or instructions, or any combination thereof for determining that the data stored in the first portion is non-sequential data based at least in part on determining that the write random index satisfies the threshold, where transferring data stored in the first portion to the second portion is based at least in part on determining that the data stored in the first portion in non-sequential data.

Aspect 11: The apparatus of any of aspects 1 through 10, further including operations, features, circuitry, logic, means, or instructions, or any combination thereof for identifying a request for the memory system to perform an access operation based at least in part on transferring data stored in the first portion to the second portion, where outputting the data transferred to the second portion of the memory system is based at least in part on identifying the request.

Aspect 12: The apparatus of any of aspects 1 through 11, further including operations, features, circuitry, logic, means, or instructions, or any combination thereof for determining that the write random index fails to satisfy the threshold based at least in part on determining the write random index and refraining from transferring, to the second portion of the memory system, the data stored in the first portion of the memory system.

Aspect 13: The apparatus of any of aspects 1 through 12, further including operations, features, circuitry, logic, means, or instructions, or any combination thereof for transferring data stored in the first portion to the second portion occurs as a background operation after the boot procedure is complete.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   determining a write random index associated with a boot procedure for a memory system, the write random index indicating a relationship between a first quantity of sequential logical addresses accessed as part of the boot procedure and a second quantity of random logical addresses accessed as part of the boot procedure;
   determining whether the write random index satisfies a threshold based at least in part on determining the write random index;
   transferring, to a second portion of the memory system, data stored in a first portion of the memory system based at least in part on determining that the write random index satisfies the threshold;
   receiving a request for the memory system to perform the boot procedure after transferring the data; and
   outputting, to a host system, the data transferred to the second portion of the memory system.

2. The method of claim 1, wherein transferring the data stored in the first portion to the second portion further comprises:
   moving a first portion of data from a first page of a first plane to a second page of a second plane; and
   moving a second portion of data from a third page of a third plane to the second page of the second plane, wherein an address of the first page that stores the second portion of data is sequentially indexed with a second address of the second page that stores the first portion of data.

3. The method of claim 1, further comprising:
   determining a sequential layout to store the data in the memory system based at least in part on determining that the write random index satisfies the threshold, wherein transferring the data stored in the first portion to the second portion is based at least in part on determining the sequential layout.

4. The method of claim 3, further comprising:
   determining a relationship between a quantity of access operations as part of the boot procedure and a quantity of planes to be accessed as part of the access operations, wherein determining the sequential layout is based at least in part on determining the relationship.

5. A non-transitory computer-readable medium storing code, the code comprising instructions executable by a processor to:
   determine a write random index associated with a boot procedure for a memory system, the write random index indicating a relationship between a first quantity of sequential logical addresses accessed as part of the boot procedure and a second quantity of random logical addresses accessed as part of the boot procedure;

determine whether the write random index satisfies a threshold based at least in part on determining the write random index;

transfer, to a second portion of the memory system, data stored in a first portion of the memory system based at least in part on determining that the write random index satisfies the threshold;

receive a request for the memory system to perform the boot procedure after transferring the data; and output, to a host system, the data transferred to the second portion of the memory system.

6. The non-transitory computer-readable medium of claim 5, wherein the instructions to transfer the data stored in the first portion to the second portion are further executable by the processor to:

move a first portion of data from a first page of a first plane to a second page of a second plane; and move a second portion of data from a third page of a third plane to the second page of the second plane, wherein an address of the first page that stores the second portion of data is sequentially indexed with a second address of the second page that stores the first portion of data.

7. The non-transitory computer-readable medium of claim 5, wherein the instructions are further executable by the processor to:

determine a sequential layout to store the data in the memory system based at least in part on determining that the write random index satisfies the threshold, wherein transferring the data stored in the first portion to the second portion is based at least in part on determining the sequential layout.

8. The non-transitory computer-readable medium of claim 7, wherein the instructions are further executable by the processor to:

determine a relationship between a quantity of access operations as part of the boot procedure and a quantity of planes to be accessed as part of the access operations, wherein determining the sequential layout is based at least in part on determining the relationship.

9. The non-transitory computer-readable medium of claim 7, wherein the sequential layout is based at least in part on a read quad plane, a cache read multiplane, or both.

10. The non-transitory computer-readable medium of claim 5, wherein the instructions are further executable by the processor to:

determine a relationship between a first quantity of data from at least a first plane of the memory system and a second quantity of data from a second plane of the memory system, wherein determining the write random index is based at least in part on determining the relationship.

11. The non-transitory computer-readable medium of claim 5, wherein the instructions are further executable by the processor to:

compare a quantity of access operations for one or more planes to be accessed as part of the boot procedure to the threshold based at least in part on determining the write random index, wherein determining whether the write random index satisfies the threshold wherein is based at least in part on the comparing.

12. The non-transitory computer-readable medium of claim 5, wherein the instructions are further executable by the processor to:

store, in the memory system, a sequence of addresses accessed as part of the boot procedure, wherein determining the write random index is based at least in part on storing the boot procedure, and wherein the boot procedure comprises a set of addresses accessed during the boot procedure.

13. An apparatus, comprising:

a memory array; and a controller coupled with the memory array, wherein the controller is configured to cause the apparatus to:

determine a write random index associated with a boot procedure for a memory system, the write random index indicating a relationship between a first quantity of sequential logical addresses accessed as part of the boot procedure and a second quantity of random logical addresses accessed as part of the boot procedure;

determine whether the write random index satisfies a threshold based at least in part on determining the write random index;

transfer, to a second portion of the memory system, data stored in a first portion of the memory system based at least in part on determining that the write random index satisfies the threshold;

receive a request for the memory system to perform the boot procedure after transferring the data; and output, to a host system, the data transferred to the second portion of the memory system.

14. The apparatus of claim 13, wherein transferring the data stored in the first portion to the second portion is further configured to cause the apparatus to:

move a first portion of data from a first page of a first plane to a second page of a second plane; and move a second portion of data from a third page of a third plane to the second page of the second plane, wherein an address of the first page that stores the second portion of data is sequentially indexed with a second address of the second page that stores the first portion of data.

15. The apparatus of claim 13, wherein the controller is further configured to cause the apparatus to:

determine a sequential layout to store the data in the memory system based at least in part on determining that the write random index satisfies the threshold, wherein transferring the data stored in the first portion to the second portion is based at least in part on determining the sequential layout.

16. The apparatus of claim 15, wherein the controller is further configured to cause the apparatus to:

determine a relationship between a quantity of access operations as part of the boot procedure and a quantity of planes to be accessed as part of the access operations, wherein determining the sequential layout is based at least in part on determining the relationship.

17. The apparatus of claim 15, wherein the sequential layout is based at least in part on a read quad plane, a cache read multiplane, or both.

18. The apparatus of claim 13, wherein the controller is further configured to cause the apparatus to:

determine a relationship between a first quantity of data from at least a first plane of the memory system and a second quantity of data from a second plane of the memory system, wherein determining the write random index is based at least in part on determining the relationship.

19. The apparatus of claim 13, wherein the controller is further configured to cause the apparatus to:

compare a quantity of access operations for one or more planes to be accessed as part of the boot procedure to the threshold based at least in part on determining the write random index, wherein determining whether the write random index satisfies the threshold wherein is based at least in part on the comparing.

20. The apparatus of claim 13, wherein the controller is further configured to cause the apparatus to:
store, in the memory system, a sequence of addresses accessed as part of the boot procedure, wherein determining the write random index is based at least in part on storing the boot procedure, and wherein the boot procedure comprises a set of addresses accessed during the boot procedure.

21. The apparatus of claim 13, wherein the controller is further configured to cause the apparatus to:
store the data in the second portion of the memory system based at least in part on transferring data stored in the first portion to the second portion; and
determine that the data stored in the second portion is sequential data, wherein outputting the data is based at least in part on determining that the data is sequential data.

22. The apparatus of claim 13, wherein the controller is further configured to cause the apparatus to:
determine that the data stored in the first portion is non-sequential data based at least in part on determining that the write random index satisfies the threshold, wherein transferring the data stored in the first portion to the second portion is based at least in part on determining that the data stored in the first portion in non-sequential data.

23. The apparatus of claim 13, wherein the controller is further configured to cause the apparatus to:
identify a request for the memory system to perform an access operation based at least in part on transferring the data stored in the first portion to the second portion, wherein outputting the data transferred to the second portion of the memory system is based at least in part on identifying the request.

24. The apparatus of claim 13, wherein the controller is further configured to cause the apparatus to:
determine that the write random index fails to satisfy the threshold based at least in part on determining the write random index; and
refrain from transferring, to the second portion of the memory system, the data stored in the first portion of the memory system.

25. The apparatus of claim 13, wherein transferring the data stored in the first portion to the second portion occurs as a background operation after the boot procedure is complete.

* * * * *